United States Patent
Raithel et al.

(10) Patent No.: US 11,512,476 B2
(45) Date of Patent: Nov. 29, 2022

(54) SHIELDING DEVICE FOR SHADING AND RAIN PROTECTION PURPOSES

(71) Applicant: Ettlin Aktiengesellschaft, Ettlingen (DE)

(72) Inventors: Tobias Raithel, Ettlingen (DE); Oliver Maetschke, Ettlingen (DE)

(73) Assignee: Ettlin Aktiengesellschaft, Ettlingen (DE)

( * ) Notice: Subject to any disclaimer, the term of this patent is extended or adjusted under 35 U.S.C. 154(b) by 637 days.

(21) Appl. No.: 16/662,684

(22) Filed: Oct. 24, 2019

(65) Prior Publication Data

US 2020/0056376 A1   Feb. 20, 2020

Related U.S. Application Data

(63) Continuation of application No. PCT/EP2018/061664, filed on May 7, 2018.

(30) Foreign Application Priority Data

May 8, 2017  (DE) .................... 10 2017 109 789.9

(51) Int. Cl.
*E04F 10/06* (2006.01)
*B32B 5/02* (2006.01)
(Continued)

(52) U.S. Cl.
CPC .............. *E04F 10/06* (2013.01); *B32B 5/024* (2013.01); *B32B 5/06* (2013.01); *B32B 5/26* (2013.01);
(Continued)

(58) Field of Classification Search
CPC ................ Y10T 442/3325; E04F 10/06; E04F 10/0681; D10B 2401/22; D10B 2505/18;
(Continued)

(56) References Cited

U.S. PATENT DOCUMENTS 5,431,979 A    7/1995  Dellinger et al.
2003/0082969 A1  5/2003  Arthurs
(Continued)

FOREIGN PATENT DOCUMENTS

DE    8327646 U1   12/1983
DE    9217218 U1    4/1994
(Continued)

OTHER PUBLICATIONS

English Translation of the International Search Report, PCT/EP2018/061664, dated Aug. 9, 2018 3 pages.
(Continued)

*Primary Examiner* — Arti Singh-Pandey
(74) *Attorney, Agent, or Firm* — Bose McKinney & Evans LLP

(57) ABSTRACT

A shielding device for shielding against weather influences that includes a textile sheet material which is stretched two-dimensionally or can be rolled out and which forms a shield against weather influences, in particular, against solar radiation and/or rain. The textile material has warp threads and weft threads connected together in a lattice-like manner so as to form a fabric. A foam layer which has foam pores that are separated from one another by solid foam walls is applied onto the textile sheet material on at least one side of the textile sheet material.

17 Claims, 2 Drawing Sheets

(51) Int. Cl.
*B32B 5/06* (2006.01)
*B32B 5/26* (2006.01)
*D03D 1/00* (2006.01)
*D03D 11/00* (2006.01)
*D06N 3/00* (2006.01)
*D03D 25/00* (2006.01)

(52) U.S. Cl.
CPC ............ *D03D 1/007* (2013.01); *D03D 11/00* (2013.01); *D03D 25/00* (2013.01); *D06N 3/0006* (2013.01); *D06N 3/0043* (2013.01); *D06N 3/0086* (2013.01); *B32B 2250/02* (2013.01); *B32B 2250/20* (2013.01); *B32B 2255/02* (2013.01); *B32B 2255/26* (2013.01); *B32B 2262/0284* (2013.01); *B32B 2266/0278* (2013.01); *B32B 2266/06* (2013.01); *B32B 2307/4026* (2013.01); *B32B 2307/416* (2013.01); *B32B 2307/42* (2013.01); *B32B 2307/71* (2013.01); *B32B 2307/712* (2013.01); *B32B 2307/73* (2013.01); *D06N 2205/04* (2013.01); *D06N 2205/14* (2013.01); *D06N 2209/0823* (2013.01); *D06N 2209/142* (2013.01); *D06N 2211/125* (2013.01); *D10B 2401/22* (2013.01); *D10B 2505/18* (2013.01); *E04F 10/0681* (2013.01); *Y10T 442/3325* (2015.04)

(58) Field of Classification Search
CPC ........... D06N 2205/04; D06N 2205/14; D06N 2209/0823; D06N 2209/142; D06N 2211/125; D06N 3/0006; D06N 3/0043; D06N 3/0086; D03D 11/00; D03D 19/00; D03D 1/007; D03D 25/00; B32B 2250/02; B32B 2250/20; B32B 2255/02; B32B 2255/26; B32B 2262/0284; B32B 2266/0214; B32B 2266/0235; B32B 2266/0242; B32B 2266/0264; B32B 2266/0278; B32B 2266/06; B32B 2307/4026; B32B 2307/412; B32B 2307/416; B32B 2307/42; B32B 2307/71; B32B 2307/712; B32B 2307/718; B32B 2307/724; B32B 2307/73; B32B 2307/732; B32B 2307/734; B32B 2419/00; B32B 2571/00; B32B 27/065; B32B 27/12; B32B 5/024; B32B 5/028; B32B 5/06; B32B 5/20; B32B 5/245; B32B 5/26; B32B 5/32

See application file for complete search history.

(56) References Cited

U.S. PATENT DOCUMENTS

| | | |
|---|---|---|
| 2004/0189042 A1 | 9/2004 | Jarrard et al. |
| 2014/0080375 A1 | 3/2014 | Hänsch |
| 2016/0230451 A1 | 8/2016 | Hänsch |

FOREIGN PATENT DOCUMENTS

| | | |
|---|---|---|
| DE | 20017882 U1 | 1/2001 |
| DE | 202011107186 U1 | 2/2013 |
| EP | 2527507 A1 | 11/2012 |
| EP | 2862968 A1 | 4/2015 |

OTHER PUBLICATIONS

English Translation of the International Preliminary Report on Patentability, PCT/EP2018/061664, dated Aug. 23, 2019, 8 pages.
Eagle, Insulated Tarps, https://www.eagleind.com/wp-content/uploads/2015/09/Insulated-Tarps.pdf (2015), 2 pages.

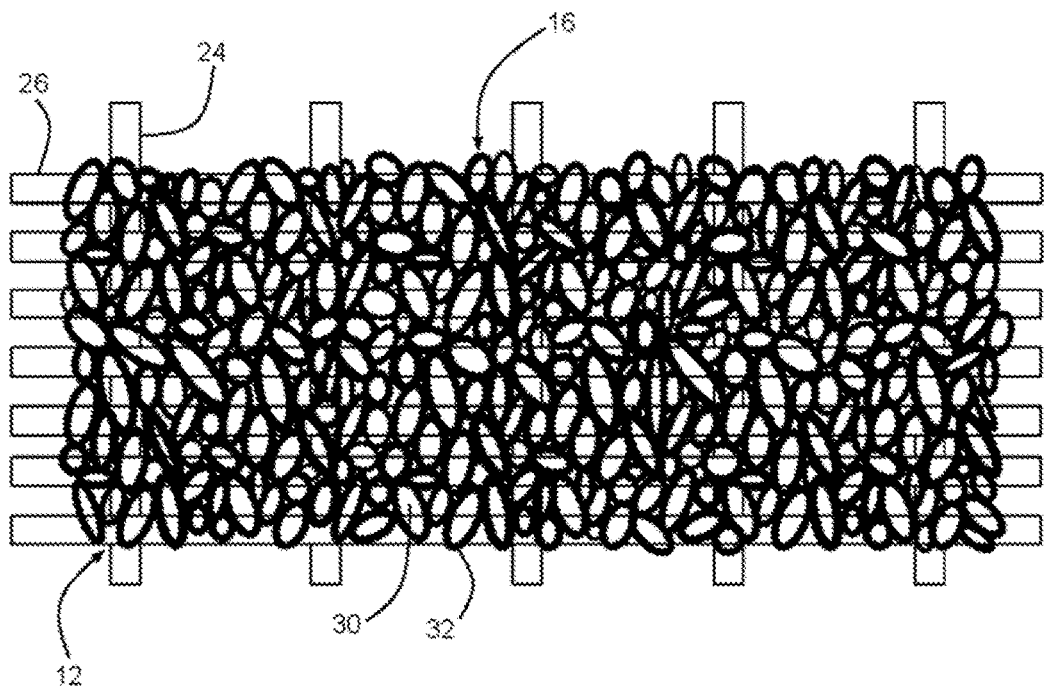

Fig. 3

| | Foam layer on weft face | Foam layer on warp face | Foam layer warp and weft face | Increase in the foam application: |
|---|---|---|---|---|
| Foam application: | 16 g/m² | 18 g/m² | 33 (17+16) g/m² | |
| Degree of light transmittance: | 0.1760 | 0.0753 | 0.0577 | Decrease light transmittance |
| Degree of light absorption: | 0.7970 | 0.8844 | 0.9120 | Increase degree of light absorption |
| Degree of UV transmittance: | 0.1727 | 0.0717 | 0.0557 | Decrease degree of UV transmittance |
| Degree of solar transmittance: | 0.1947 | 0.0890 | 0.0677 | Decrease degree of solar transmittance |
| Degree of solar absorption: | 0.7783 | 0.8717 | 0.9020 | Increase degree of solar absorption |
| Air permeability: | 3111 l/m²/s | 1413 l/m²/s | 1261 l/m²/s | Decrease in the air permeability |
| Water repellence: | 393.75 ml | 146.25 ml | 141.25 ml | Decrease in the water repellence |
| Water permeability: | 10, 11, 12 mbar | 11, 12, 13 mbar | 18, 19, 20 mbar | Decrease in the water permeability |
| UPF rating (light protection): | | 15 | 20 | Increase in the UPF (Ultraviolet Protection Factor) rating |
| Foam application: | 16 g/m² | 18 g/m² | 33(17+16) g/m² | |

Fig. 4

SHIELDING DEVICE FOR SHADING AND RAIN PROTECTION PURPOSES

CROSS REFERENCE TO RELATED APPLICATIONS

This is a continuation of application serial no. PCT/EP2018/061664 filed May 7, 2018 which claims priority from German patent application DE 10 2017 109 789.9 filed May 8, 2017, the disclosures of both of which are hereby incorporated herein by reference.

BACKGROUND

The present disclosure relates to a shielding device for shading and rain-protection purposes, comprising a textile sheet material which is tensioned or can be rolled out in a planar manner and forms a shield against weather influences, in particular against solar radiation and/or rain, and, as a woven fabric, has warp threads and weft threads connected to one another in a lattice-like manner.

A weather protection device is known from EP 2 527 507 A1, in which the warp and weft threads define elongate and comparatively tight lattice openings, the water repellence being supported by a hydrophobing agent. In this device, however, the transparency and the passage of air can only be altered by changing the parameters of the woven fabric.

SUMMARY

One problem addressed by the present disclosure is that of further improving the devices known in the prior art and providing a protective device which has functional properties that can be adjusted.

The present application discloses the concept of using a prefabricated woven fabric as a support structure for a functional coating which can be adjusted in terms of the properties thereof. For example, it is possible to apply a foam layer onto the textile sheet material, as a support, on at least one face of the woven fabric, i.e., at least one major planar surface of the woven fabric, wherein the foam layer has foam pores that are separated from one another by solid foam walls. It is possible to adjust different properties, such as air permeability, transparency, shading and water repellence, to a desired extent by means of the foam layer, without the woven support fabric having to be changed. In principle it is also possible, however, to achieve an additional variability using woven fabric having different properties.

The foam layer is advantageously open-pored, such that a certain degree of openness is achieved transverse to the layer plane.

In this case, it is beneficial for the foam pores to have a diameter in the range of 0.01 to 0.5 mm.

In order to provide a stable coating which adheres well, it is advantageous for the foam layer to consist of a foamed plastics material selected from the following group: polyurethane, polyester, polyvinylchloride, polyamide, polyacrylate, acrylic acid ester and the respective copolymers thereof, and silicone. The foam layer preferably consists of a cured polyurethane foam.

In order to improve the water-repelling properties, it is advantageous for the foam layer to be hydrophobically equipped with a hydrophobing agent.

With regard to transparency and resistance to aging, it is further advantageous for the foam layer to be dyed a dark color using carbon black or pigments, or to be provided with an additive which acts as a UV (ultraviolet) filter and/or IR (infrared) reflector.

It is beneficial for an even layer thickness of the foam layer to be applied onto the textile sheet material by means of a coating process, preferably by blade coating.

The foam layer is advantageously applied to the textile sheet material in a surface weight in the range of 10 to 100 g/m².

A particularly advantageous support structure can be achieved with a textile sheet material having a two-layer woven fabric structure made from warp threads forming a warp thread layer, and weft threads forming a weft thread layer which on one face rests on the warp thread layer, the warp threads and the weft threads both being tensioned in a substantially linear manner.

In order to ensure a particular dimensional stability and tightness of the lattice geometry, it is also advantageous for the warp threads and weft threads to define elongate rectangular openings in the woven fabric, the openings in the woven fabric being delimited on the long side thereof by the weft threads, and for the warp threads and the weft threads to be connected to one another in a Dreher weave by binding threads, the binding threads wrapping around the outer faces of the warp threads and weft threads, which face face away from one another.

An advantageous embodiment provides that the textile sheet material is held in a holding or tensioning device for a large-surface-area shield. It is also possible that the textile sheet material can be rolled out and deployed in a planar configuration by means of a winding device. It is moreover conceivable to insert the textile sheet material in a portion of a sheeting surface, for example tent sheeting.

The textile sheet material is advantageously arranged in an outside area, in front of a building for example, such that it shields an area which is to be protected against weather influences.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 3 is a plan view of a portion of the textile sheet material and the foam layer located thereon;

FIG. 4 is a chart of test results for different laboratory prototypes.

Corresponding reference characters indicate corresponding parts throughout the several views.

DETAILED DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

It should be understood that the terms "horizontal" and "vertical" are generally used herein to establish positions of individual components relative to one another rather than an absolute angular position in space. Further, regardless of the reference frame, in this disclosure terms such as "vertical," "parallel," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "weft thread," "warp thread," "fabric," to name just a few, should be interpreted when appearing in this disclosure and claims to mean "one or more" or "at least one." All other terms used herein should be similarly interpreted unless it is made explicit that a singular interpretation is intended.

Figure 1:
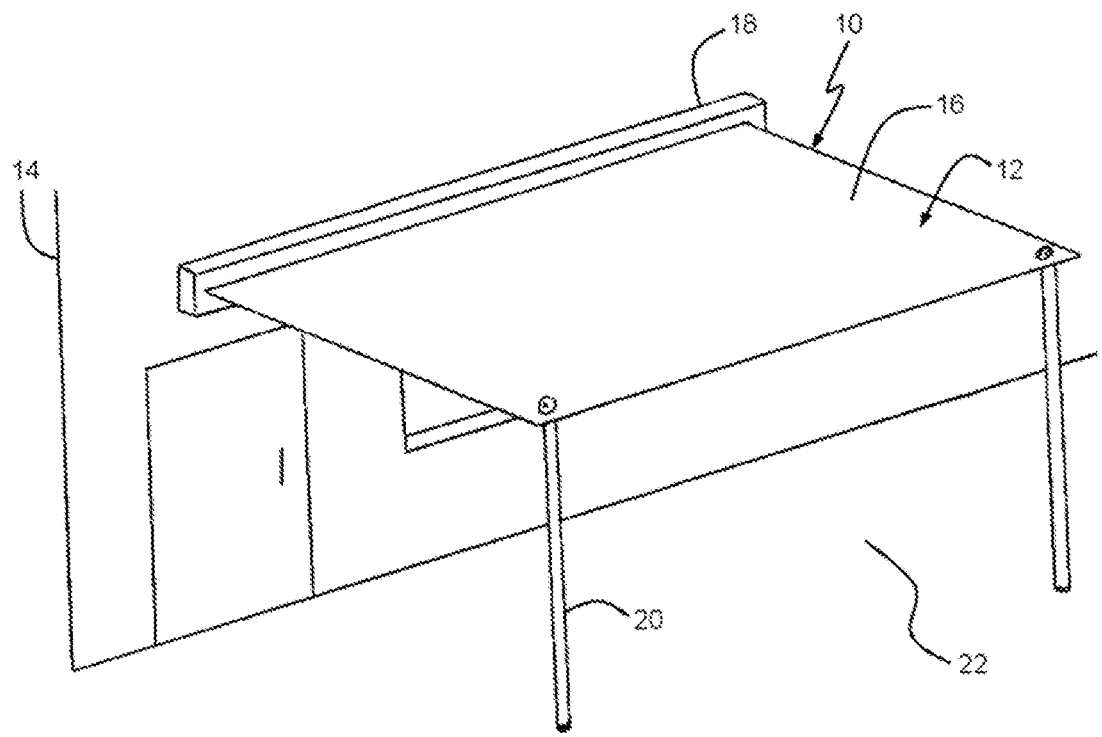
FIG. 1 is a diagram of a shielding device on a building for shading and rain protection purposes.

The shielding and weather protection device 10 shown in FIG. 1 comprises a textile sheet material 12 which is tensioned on the exterior of a building 14 as a shield against solar radiation and rain, and is provided with a foam layer 16 on the upper face thereof in the illustrated example. For this purpose, the textile sheet material 12 can be pulled out of a winding device 18 in a web-like manner and can be fixed to supports on the free end 20 thereof. In this case, a shielded region or area 22 under the textile sheet material 12 is protected from direct solar radiation and from rain.

Figure 2:
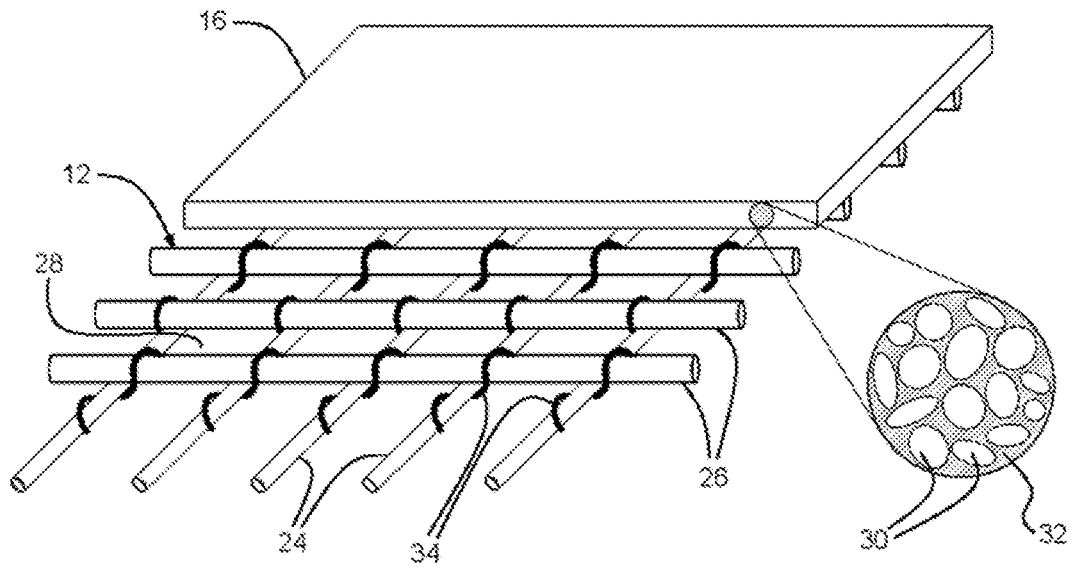
FIG. 2 is an enlarged diagram of a portion of a textile sheet material of the shielding device that is provided with a foam layer.

As is illustrated, not to scale, in FIGS. 2 and 3, the textile sheet material 12 has warp threads 24 and weft threads 26 which are connected to one another in a lattice-like manner. The warp threads 24 extend in the longitudinal direction of the woven fabric web, having a relatively large mutual spacing of the threads, while the weft threads 26, maintaining a relatively tight mutual spacing of the threads, cross the warp threads 24 at right angles. In this manner, elongate rectangular lattice openings 28 are kept clear in the lattice-like sheet material 12. The foam layer 16 has foam pores or foam cells 30, which are laterally separated from one another by solid foam walls 32. In this manner, combined with the lattice openings 28 of the textile sheet material 12, a certain degree of transparency and air permeability can be ensured while permeation by rain or undesirable solar radiation is largely prevented by the tight gaps.

As shown in FIG. 2, the textile sheet material 12 has a two-layer woven fabric structure, in which the warp threads 24 and weft threads 26 are tensioned in a linear manner, and each form a separate, planar thread layer, such that the two thread layers rest on one another on one face of each of the two thread layers.

The warp threads 24 and weft threads 26 are fixed in position relative to one another by thin binding threads 34, in the manner of a Dreher weave. The binding threads 34 extend through the two thread layers of the warp threads 24 and the weft threads 26 and wrap around the outer faces thereof that face away from one another.

The woven fabric formed in this manner is extremely low-stretch and dimensionally stable as a result of the tensioned thread layers. The force and stretch properties can be adjusted independently of one another in the warp and weft. Very open, but also very tight woven fabrics having a high level of uniformity can be produced. Furthermore, the two faces can be coated with the foam layer 16 independently of one another, it also being possible to apply a plurality of layers on top of one another.

The warp, weft and binding threads expediently consist of a monofilament, polymer thread material, for example PET (polyethylene terephthalate). The thread thicknesses of the warp and weft threads 24, 26 are in the range of 0.08 to 0.3 mm, while the thinner binding threads 34 have a thickness of 0.05 to 0.1 mm.

The foam layer is open-pored or open-celled, i.e. the foam pores 30 are not closed on all faces, but instead are only separated from one another in the layer plane by foam walls 32. The tightness and porosity can be adjusted by means of the variably adjustable coating application which optionally uses a water repellent finishing, for example fluorocarbon. It is therefore possible to adjust properties such as air permeability, transparency, water repellence, and shading effect in a desired direction in a targeted manner.

The foam layer 16 can consist of a cured polyurethane foam, the foam pores of which can be adjusted to a desired diameter in a range of 0.0 to 0.5 mm wide by a suitable foaming before the foam is applied. The foam coating can be produced by blade coating onto the prefabricated woven fabric, the woven fabric or textile sheet material 12 being transported through under a blade, and a type of foam roller being supplied to the blade. In the exemplary embodiment, the foam layer 16 can be applied in a surface weight in the range of 10 to 100 g/m$^2$. The desired layer thickness can, for example, be defined in the range of 0.1 to 1 mm thick.

The foam layer 16 can be further functionalized using additives or finishings such as UV blockers and hydrophobing agents. In particular a black coloring, and therefore an improved transparency and slowed UV aging can be provided using pigments (carbon black). In principle, a desired optical or artistic effect can also be achieved.

For the stated weather protection functions there are various possible uses, for example as an awning, shade sail, umbrella or tent material, to avoid a build-up of heat. The textile material can be folded or wound up by means of a tensioning or winding device. In principle, a permanent tensioning is also conceivable, in particular as a textile architectural element or facade cladding on a building.

In laboratory prototypes, the variability of various properties can be clearly demonstrated by varying the foam application on a two-layer, previously described woven support fabric, as is shown in the chart in FIG. 4. The foam is an open-celled structure made of the following components: polyurethane comprising a foam enhancer and a foam stabilizer, fluorocarbon, and carbon black. Carbon black provides black coloring, UV protection and matches the foam with the black woven base fabric in terms of color. In the three different embodiments shown in the chart in FIG. 4, the foam layer 16 is applied to the weft face, the warp face and onto both faces of a provided woven material 12. As can be seen from the different test results, it is possible to influence the light, solar and UV transmissions within broad ranges by means of the foam application. The open celled foam layer at the same time also affects the air and water permeability.

While this invention has been described as having an exemplary design, the present invention may be further modified within the spirit and scope of this disclosure. This application is therefore intended to cover any variations, uses, or adaptations of the invention using its general principles.

What is claimed is:

1. A shielding device for shading and rain-protection purposes, the shielding device comprising:
a textile sheet material which is tensioned or can be rolled out into a planar configuration and is adapted to form a shield against solar radiation or rain, the textile sheet material having a woven fabric and a foam layer, the foam layer having foam pores that are separated from one another by solid foam walls, the foam layer being applied on at least one major surface of the woven fabric, the foam layer being open-pored; and
wherein the woven fabric is a two-layered woven structure made from warp threads forming a warp thread layer, and weft threads forming a weft thread layer, one surface of the weft thread layer being engaged with the warp thread layer, the warp threads being tensioned in a substantially linear manner and the weft threads being tensioned in a substantially linear manner, the warp threads and weft threads being connected to one another to form a lattice-shaped structure wherein the warp threads and weft threads define elongate rectangular openings in the woven fabric, the openings in the woven fabric being delimited on the long side thereof by the weft threads, and wherein the textile sheet material is adapted to be positioned with the foam layer forming the upper surface of the textile sheet material.

2. The shielding device according to claim 1, characterized in that the foam pores have a diameter in the range of 0.01 to 0.5 mm.

3. The shielding device according to claim 1, characterized in that the foam layer is formed by a foamed plastics material selected from one or more of the group consisting of: polyurethane, polyester, polyvinylchloride, polyamide, polyacrylate, acrylic acid ester and the respective copolymers thereof, and silicone.

4. The shielding device according to claim 1, characterized in that the foam layer comprises a hydrophobing agent whereby the foam layer is adapted to repel water.

5. The shielding device according to claim 1, characterized in that the foam layer is dyed a dark color using carbon black or pigments.

6. The shielding device according to claim 1, characterized in that the foam layer comprises an additive which is a UV filter and/or an IR reflector.

7. The shielding device according to claim 1, characterized in that the foam layer is applied to the woven fabric by a blade coating process.

8. The shielding device according to claim 1, characterized in that the foam layer has a surface weight in the range of 10 to 100 g/m$^2$.

9. The shielding device according to claim 1, characterized in that the warp threads and the weft threads are connected to one another by binding threads, the binding threads wrapping around the outer surfaces of the warp and weft threads, the outer surfaces of the warp and weft threads facing away from one another.

10. The shielding device according to claim 1, characterized in that the textile sheet material is held in a holding or tensioning device with the textile sheet in a planar configuration.

11. The shielding device according to claim 1, further comprising a winding device wherein the textile sheet material is rolled out by the winding device to deploy the shielding device.

12. The shielding device according to claim 11, characterized in that the textile sheet material shields an area against weather influences when extended from the winding device.

13. The shielding device according to claim 9, characterized in that the foam pores have a diameter in the range of 0.01 to 0.5 mm.

14. The shielding device according to claim 13, characterized in that the foam layer is formed by a foamed plastics material selected from one or more of the group consisting of: polyurethane, polyester, polyvinylchloride, polyamide, polyacrylate, acrylic acid ester and the respective copolymers thereof, and silicone.

15. The shielding device according to claim 14, characterized in that the foam layer has a surface weight in the range of 10 to 100 g/m$^2$.

16. The shielding device according to claim 15, characterized in that the foam layer comprises a hydrophobing agent whereby the foam layer is adapted to repel water.

17. The shielding device according to claim 16, characterized in that the foam layer comprises an additive which is a UV filter and/or an IR reflector.

* * * * *